July 17, 1962    C. A. STANDING ET AL    3,044,795
TRAILER WITH STEERABLE WHEELS
Filed June 30, 1961    3 Sheets-Sheet 1

INVENTORS
Charles A. Standing and
BY  Harold H. Bailey
Frease, Bishop, Johns & Schick
ATTORNEYS July 17, 1962   C. A. STANDING ET AL   3,044,795
TRAILER WITH STEERABLE WHEELS
Filed June 30, 1961   3 Sheets-Sheet 2

INVENTORS
Charles A. Standing and
BY   Harold H. Bailey
Frease, Bishop, Johns & Schick
ATTORNEYS July 17, 1962  C. A. STANDING ET AL  3,044,795
TRAILER WITH STEERABLE WHEELS
Filed June 30, 1961  3 Sheets-Sheet 3

INVENTORS
Charles A. Standing and
BY  Harold H. Bailey
Frease, Bishop, Johns & Schick
ATTORNEYS

United States Patent Office 3,044,795
Patented July 17, 1962

3,044,795
TRAILER WITH STEERABLE WHEELS
Charles A. Standing, 1079 W. Ely St., Alliance, Ohio, and Harold H. Bailey, 3364 Porter Road, New Milford, Ohio
Filed June 30, 1961, Ser. No. 121,031
7 Claims. (Cl. 280—81)

The invention relates to trailers and more particularly to a trailer having a plurality of wheel axles which are automatically steerable so as to cause the wheels thereon to traverse substantially the path of the wheels of the tractor or other draft vehicle towing the trailer.

It is known that prior tractor-trailer constructions have been suggested which include means for steering the rear axles of the trailer through hydraulic and mechanical mechanisms operated from the steering mechanism of the tractor.

Other prior art constructions include linkage operatively connecting the rear wheels of the trailer to the tractor for steering the rear wheels of the trailer by the turning movement of the tractor.

Such prior art constructions have certain disadvantages. Some of these constructions are relatively expensive, and in some cases require substantial modifications in the normal trailer construction. Furthermore, it is necessary that such separable steering mechanism, operated by the steering mechanism of the tractor, be connected and disconnected each time the trailer and tractor are coupled together or uncoupled.

It is also well recognized that, particularly in the case of trailers having large carrying capacities, it is desirable that a plurality of axles be provided therefor and that the spacing between axles be not less than a certain prescribed distance, so that the load per axle will not exceed certain predetermined maximum values limited by the law in many states.

For instance, certain state laws provide that in order to take advantage of the maximum load per axle, that the axles be spaced apart a distance not less than 9 feet. Also, where tandem trucks are provided in the undercarriage of trailers, the axles on each truck must be spaced at least 48 inches apart.

Although there is no difficulty in providing a second axle on a trailer, located the prescribed distance from the first axle thereon, when such a twin-axle trailer passes around a curve, the wheels on the rear axle of the trailer do not follow the wheels on the rear axle of the tractor but tend to slide, causing excessive wear upon the tires and also tending to cause the rear wheels of the trailer to jump curves or to cause the trailer to overturn.

It is, therefore, an object of the present invention to provide a trailer with steerable wheels which will overcome the above disadvantages and difficulties.

Another object of the invention is the provision of means whereby the front and rear wheels of a multi-axle trailer will follow along the same circle in going around a curve.

A further object of the invention is to provide means causing the wheels of a multi-axle trailer to follow substantially the same path as the wheels of the tractor or other towing vehicle.

It is also an object of the invention to provide such a multi-axle trailer having means for steering each axle independently of the steering mechanism of the tractor or towing vehicle.

Another object of the invention is to provide such a multi-axle trailer with steering means therefor, in which the axles may be spaced apart a sufficient distance for permitting the maximum load to be carried upon each axle.

Still another object of the invention is to provide such a trailer construction comprising an elongated fifth wheel which is pivotally connected intermediate its ends to the underside of the trailer chassis by a vertical pivot, and a pair of turntables pivotally connected to opposite end portions thereof by vertical pivots, said pair of turntables being slidably and pivotally connected with each other, each of said pair of turntables comprising a truck having one or more wheel axles thereon, and means for selectively pivotally connecting the forward end of the foremost of said pair of turntables, or the rear end of the rearmost of the said pair of turntables, to the chassis of the trailer.

Finally, it is an object of the invention to provide such a construction in which said elongated turntable is also mounted to rock relative to the chassis of the trailer upon a horizontal pivot.

The above and other objects, apparent from the drawings and following description, may be attained, the above described difficulties overcome and the advantages and results obtained, by the apparatus, construction, arrangement and combinations, subcombinations and parts which comprise the present invention, a preferred embodiment of which, illustrative of the best mode in which applicants have contemplated applying the principle, being set forth in detail in the following description and illustrated in the accompanying drawings, in which.

Referring now more particularly to the embodiment of the invention illustrated in the drawings, in which similar numerals refer to similar parts throughout, a conventional tractor is indicated generally at 1, and the chassis of the trailer to which the invention pertains is indicated at 2.

Figure 1:
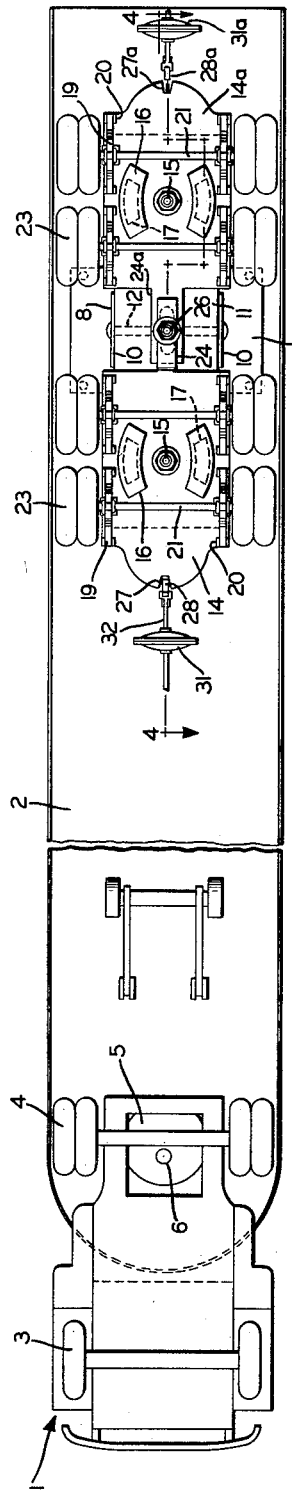
FIG. 1 is a bottom plan view of a trailer with steerable wheels embodying the invention, showing the same attached to a conventional tractor.
Figure 2:
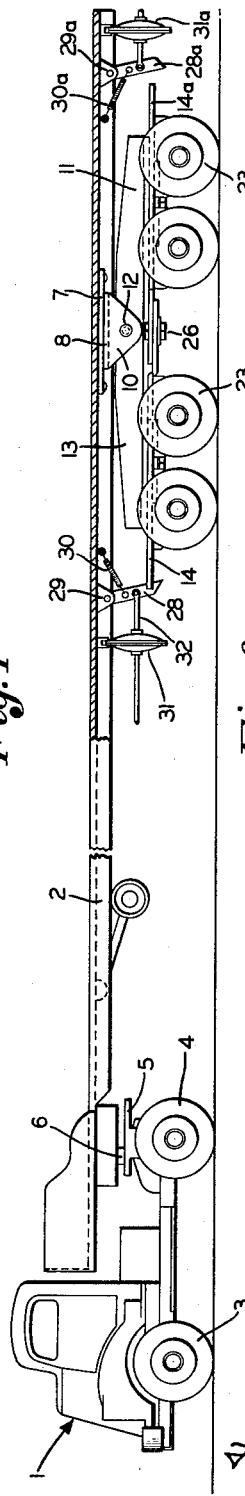
FIG. 2 is a side elevation of the same.

As in usual manner, the tractor may be provided with front wheels 3 adapted to be steered in any conventional manner and rear wheels 4. The usual fifth wheel 5 is provided upon the rear portion of the tractor for pivotally connecting the forward end of the trailer chassis thereto as by the conventional king pin 6. The tractor itself forms no part of the invention but provides merely a draft or towing vehicle for pulling the trailer in customary manner.

The steerable undercarriage for the trailer includes a transversely disposed bed plate 7, fixed to the underside of the chassis 2 at a point spaced from the rear end thereof. A transversely disposed yoke 8 is pivotally connected at its center to the center of the bed plate 7 by the vertical king pin 9. This yoke has the depending flanges 10 at opposite ends.

A longitudinally disposed elongated fifth wheel 11 is pivotally connected to the yoke 8 by the transversely disposed horizontal shaft 12 located through the flanges 10 of the yoke and the flanges 13 of the elongated fifth wheel member 11.

With this construction, the elongated fifth wheel member 11 may move pivotally relative to the chassis 2 in a horizontal plane around the vertical pivot 9, and may rock vertically upon the horizontal pivot 12 to compensate for projections or depressions in the road over which the trailer is passing.

A pair of similar fifth wheels, comprising the forward fifth wheel 14 and the rear fifth wheel 14a, are pivotally connected to opposite end portions of the elongated fifth wheel 11 by the vertical king pins 15.

Each of the fifth wheels 14 and 14a is provided with two or more arcuate recesses 16 in its upper surface. The elongated fifth wheel 11 is provided with depending arcuate projections 17, of less length than the arcuate recesses 16 which receive the same.

This construction forms a sliding bearing for the pair of fifth wheels 14 and 14a relative to the elongated fifth wheel 11, and the recesses 16 may be filled with lubricating grease to reduce the friction and wear between the parts.

The pair of fifth wheels 14 and 14a provide a pair of trucks for the rear portion of the trailer. Each is shown as provided with semi-elliptic springs 19, suspended therebeneath as by conventional shackles 20. Axles 21 are attached to the springs 19, in usual and well known manner, as by the U-bolts 22, and wheels 23 are mounted upon these axles.

In order that the trailer may comply with certain state laws, so as to be permitted the maximum load for each axle, the rearmost axle on the forward truck 14 and the foremost axle on the rear truck 14a should be spaced apart a distance not less than 9 feet. The axles of each truck should be spaced apart a distance not less than 48 inches.

For the purpose of automatically steering the wheels 23 of the trailer and causing them to traverse substantially the same path as the rear wheels of the tractor, a pair of bars 24 and 24a are rigidly secured to the opposed end portions of the fifth wheels 14 and 14a.

One of these bars is provided with an elongated slot 25 which receives a pin 26 connected to the other bar, whereby the fifth wheels 14 and 14a are pivotally and slidably connected to each other. A tapered notch 27 is formed in the forward end of the fifth wheel 14 and a similar notch 27a is formed in the rear end of the fifth wheel 14a.

A stop lever 28 is pivoted as at 29 to the underside of the chassis 2 and adapted to be normally urged into the notch 27 as by the spring 30, and adapted to be pulled out of the notch by a fluid-operated diaphragm device 31, operatively connected to the lever 28 as by the rod 32.

A similar stop lever 28a is pivotally connected as at 29a to the underside of the chassis and adapted to be normally urged into the notch 27a by the spring 30a. A fluid-operated diaphragm device 31a is connected to the lever 28a, as by the rod 32a, for pulling the lever 28a out of the notch 27a.

In operation, when the trailer is being pulled forward the stop lever 28 is positioned in the V-notch 27 of the foremost fifth wheel 14 and the stop lever 28a is held out of engagement with the V-notch 27a of the rearmost fifth wheel 14a, as shown in the drawings.

Figure 5:
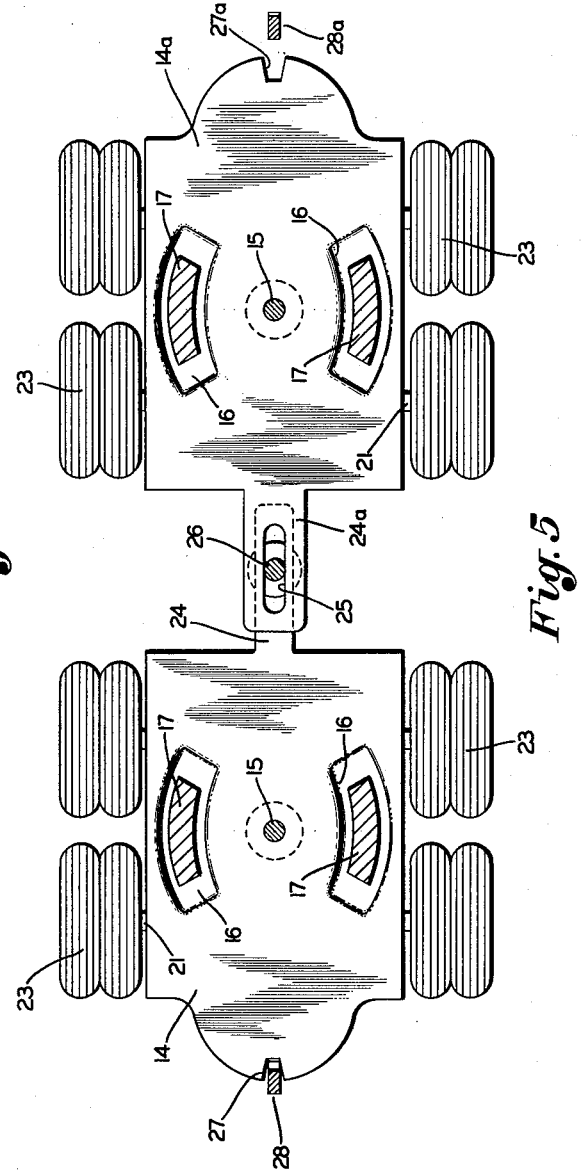
FIG. 5 is a horizontal sectional view taken on the line 5—5, FIG. 4.

When the tractor is moving in a straight line, the parts will be in the relative positions best shown in FIGS. 1 and 5, the longitudinal axis of the elongated fifth wheel 11 being parallel with the longitudinal axis of the trailer chassis. The rods 24 and 24a will be parallel and superposed, and all of the axles 21 will be parallel with each other, so that the wheels 23 of the trailer traverse the same straight path as the rear wheels 4 of the tractor.

Figure 3:
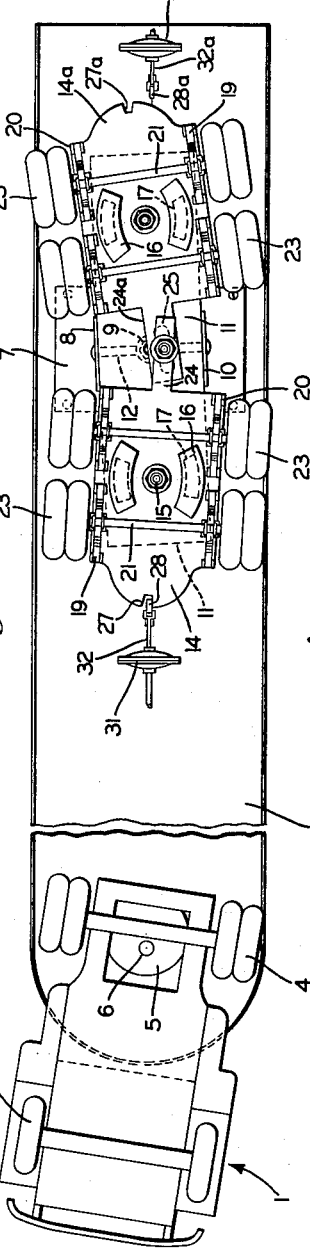
FIG. 3 is a view similar to FIG. 1 showing the relative position of the parts in making a turn.
Figure 4:
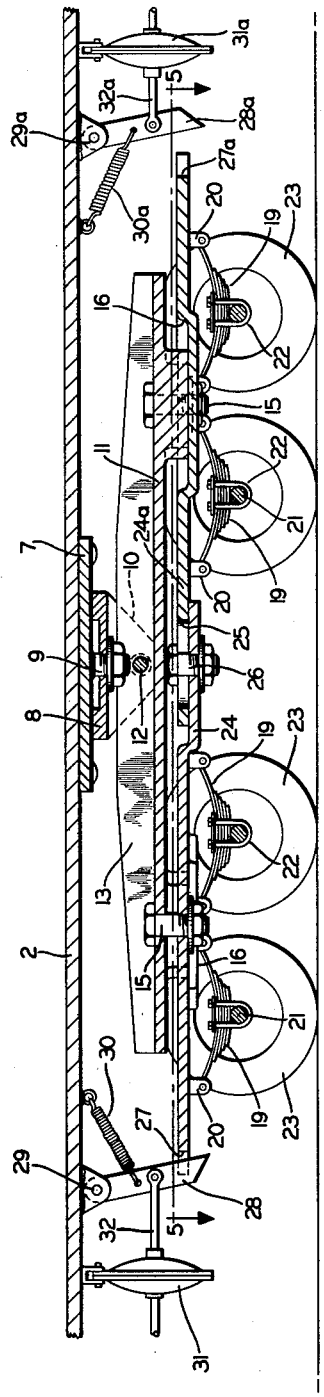
FIG. 4 is an enlarged vertical, longitudinal section through the rear portion of the trailer, showing the improved steering means for the wheels thereof, taken on the line 4—4, FIG. 1.

If the tractor turns in either direction, the trailer, through king pin 6, will be pulled in the same direction, as shown in FIG. 3. The forward fifth wheel 14 of the trailer will pivot upon the stop lever 28, and through its king pin 15, will swing the elongated fifth wheel 11 upon its pivot 9, as shown in FIG. 3.

As the bar 24 on the forward fifth wheel 11 is thus displaced, its pin 26 moves in the slot 25 of the bar 24a, causing a corresponding pivoting of the rear fifth wheel 14a about its king pin 15.

The wheels 23 of the trailer will thus be positioned to traverse the same curved path as the rear wheels 4 of the tractor. Thus, if the wheels of the tractor pass freely around a corner, the trailer wheels will follow in the same path and also pass freely around the same corner.

When it is desired to back the tractor, the stop lever 28 is removed from the V-notch 27 of the forward fifth wheel 14 and the stop lever 28a is moved into the V-notch 27a of the rear fifth wheel 14a. As the tractor is backed, the rear fifth wheel 14a will pivot upon the stop lever 28a, and through its king pin 15 will swing the elongated fifth wheel 11 upon its pivot 9.

As the bar 24a upon the rear fifth wheel 14a is thus displaced, the pin 26 on the bar 24 of the forward fifth wheel 14 will slide in the slot 25 of the bar 24a, pivoting the forward fifth wheel 14 upon its king pin 15.

Although the invention is disclosed as providing two wheel axles 21 upon each of the fifth wheels 14 and 14a, equally spaced on each side of the king pin 15 thereof, it should be understood that without otherwise changing the construction, a single wheel axle may be carried by each of the fifth wheels 14 and 14a, the single axle in this case being located in the same vertical plane as the king pin for each fifth wheel, or a single axle may be carried by one of the fifth wheels 14 or 14a and two axles may be carried by the other fifth wheel.

Figure 7:
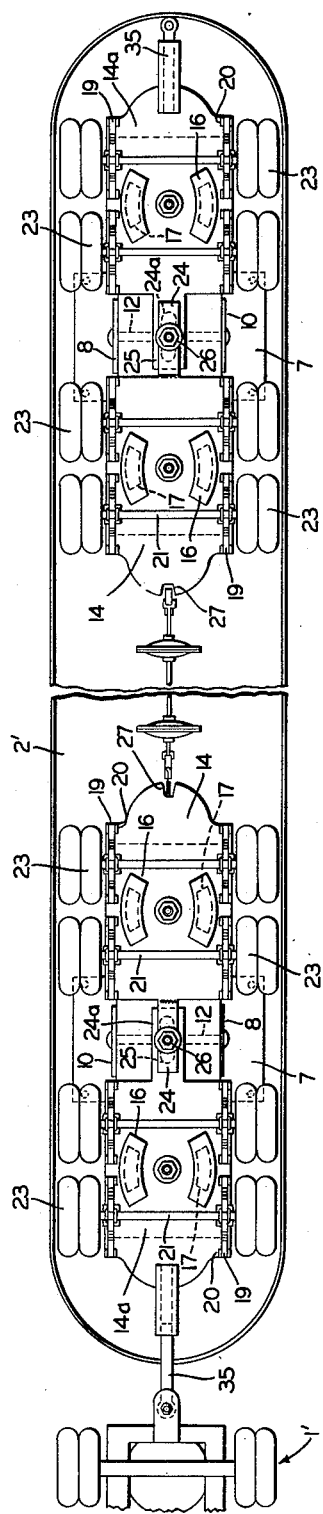
FIG. 7 is a bottom plan view of the trailer shown in FIG. 6.
Figure 6:
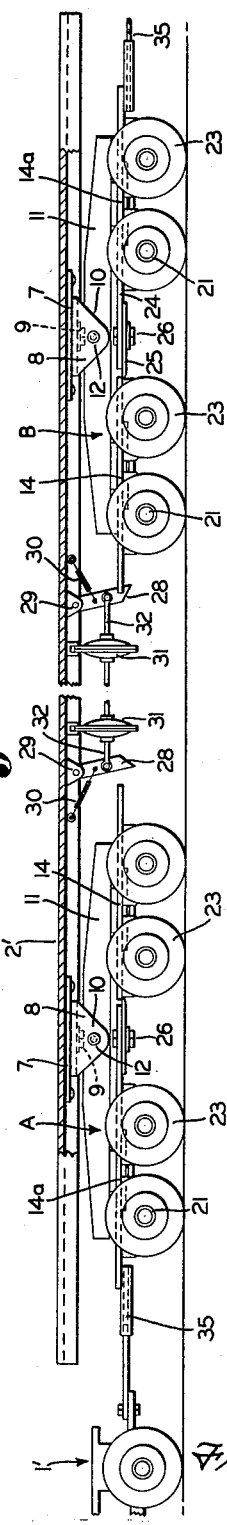
FIG. 6 is a side elevation of a trailer showing one of the novel undercarriages of steerable wheels located at each end of the trailer.

Referring to FIGS. 6 and 7, another application of the invention is shown, in which one of the novel undercarriages of steerable wheels is located at each end of a trailer, with means for connecting either end of the trailer to a tractor or other towing vehicle.

In this application of the invention, each of the undercarriages of steerable wheels is of the same construction and arrangement as shown and described in FIGS. 1 to 5, and the same reference numerals as used therein indicate similar parts.

The tractor or towing vehicle is indicated at 1' and the trailer body is indicated at 2'. The two undercarriages of steerable wheels are located near opposite ends of the trailer body, and are indicated generally at A and B.

Each of the undercarriages A and B comprise a transversely disposed bed plate 7, fixed to the trailer chassis at a point spaced from the adjacent end of the trailer, the yoke 8 being pivotally connected thereto by the king pin 9 and having the depending flanges 10 thereon.

The longitudinally disposed elongated fifth wheel 11 is pivotally connected to the yoke by the horizontal shaft 12, in the manner above described with reference to FIGS. 1 to 5.

A pair of similar fifth wheels, comprising the inwardly located fifth wheel 14 and the outwardly located fifth wheel 14a, are pivotally connected to opposite end portions of each elongated fifth wheel 11 by the bearing pins 15.

As disclosed with reference to FIGS. 1 to 5, each fifth wheel 14 and 14a may be provided with arcuate recesses 16 in its upper surface, to receive the arcuate projections 17 upon the corresponding elongated fifth wheel 11.

Semi-elliptic springs 19 may be suspended beneath each fifth wheel 14 and 14a by shackles 20 and axles 21 may be connected to said springs by U-bolts 22, and wheels 23 are mounted on said axles.

Bars 24 and 24a are rigidly attached to the opposed ends of the fifth wheels 14 and 14a, one of these bars having an elongated slot 25 therein which receives a pin 26 attached to the other bar, so that each pair of fifth wheels 14 and 14a are pivotally and slidably connected together.

A tapered notch 27 is formed in the innermost end of each fifth wheel 14. A stop lever 28 is pivoted at 29 to the underside of the chassis 2', adjacent to each of the tapered notches 27, and adapted to be normally urged into the adjacent notch, as by the spring 30, and to be pulled out of the notch by a fluid-operated diaphragm device 31 operatively connected to the lever 28, as by the rod 32.

A telescoping draw bar 35 is attached to the outermost end of each of the turntables 14a for selective attachment to the tractor or towing vehicle 1a. With this construction, either end of the trailer may be connected to the towing vehicle as desired.

Assuming that the draw bar 35 of the undercarriage A is attached to the tractor, as shown in FIGS. 6 and 7, the stop lever 28 associated with the undercarriage A, is held out of engagement with the corresponding notch 27 in the adjacent turntable 14, and the stop lever 28 associated with the undercarriage B is engaged with the corresponding notch 27, as shown in FIGS. 6 and 7.

With this arrangement, when the trailer is being drawn to the left, as shown in FIGS. 6 and 7, all of the wheels 23 of the undercarriages of the trailer will traverse the same straight path as the rear wheels of the tractor.

If the tractor turns in either direction, the trailer, through the corresponding draw bar 35, will be pulled in the same direction, and the novel undercarriages A and B will operate in the same manner as above described with reference to FIGS. 1 to 5, so that the wheels 23 of the trailer will traverse the same curved path as the rear wheels of the tractor.

If it is desired to connect the draw bar of the undercarriage B to the tractor or towing vehicle, the stop lever 28 associated with the undercarriage B is moved out of engagement with the corresponding notch 27, while the stop lever 28 associated with the undercarriage A is moved into the adjacent notch 27, and the operation is the same as above described.

From the above it will be evident that a trailer construction is provided having wheels which are automatically steerable without any connection to the tractor or other towing vehicle.

It will also be seen that the wheels of the trailer will be steered to traverse the path of the wheels of the towing vehicle when moving either forward or backward, by selectively pivotally connecting either the forward fifth wheel 14 or the rear fifth wheel 14a to the trailer chassis.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

We claim:

1. In a trailer having a chassis for pivotal attachment to a towing vehicle, an elongated fifth wheel disposed longitudinally beneath said chassis, a vertical pivot connecting the central portion of said elongated fifth wheel to the chassis, a pair of fifth wheels centrally pivotally connected to the forward and rear end portions respectively of said elongated fifth wheel, a wheel-carrying axle upon each of said pair of fifth wheels, bars rigidly mounted upon the opposed ends of said pair of fifth wheels, means slidably and pivotally connecting said bars to each other, and means for selectively alternately pivotally connecting the forward end of the foremost fifth wheel only of said pair or the rear end of the rearmost fifth wheel only of said pair to the chassis, for causing said elongated fifth wheel to pivot upon said chassis and said pair of fifth wheels to pivot upon said elongated fifth wheel so as to cause the wheels of the respective axles to traverse substantially the same path when the trailer is moving forward or backward respectively.

2. In a trailer having a chassis for pivotal attachment to a towing vehicle, an elongated fifth wheel disposed longitudinally beneath said chassis, a vertical pivot connecting the central portion of said elongated fifth wheel to the chassis, a pair of fifth wheels centrally pivotally connected to the forward and rear end portions respectively of said elongated fifth wheel, a pair of rigid parallel wheel-carrying axles upon each of said pair of fifth wheels, said axles being equally spaced on opposite sides of the pivot for the corresponding fifth wheel, bars rigidly mounted upon the opposed ends of said pair of fifth wheels, means slidably and pivotally connecting said bars to each other, and means for selectively alternately pivotally connecting the forward end of the foremost fifth wheel only of said pair or the rear end of the rearmost fifth wheel only of said pair to the chassis for causing said elongated fifth wheel to pivot upon said chassis and said pair of fifth wheels to pivot upon said elongated fifth wheel so as to cause the wheels of the respective axles to traverse substantially the same path when the trailer is moving forward or backward respectively.

3. In a trailer having a chassis for pivotal attachment to a towing vehicle, an elongated fifth wheel disposed longitudinally beneath said chassis, a vertical pivot connecting the central portion of said elongated fifth wheel to the chassis, a pair of fifth wheels pivotally connected to the forward and rear end portions respectively of said elongated fifth wheel, a wheel-carrying axle upon each of said pair of fifth wheels, bars rigidly mounted upon the opposed ends of said pair of fifth wheels, means slidably and pivotally connecting said bars to each other, and means for selectively pivotally connecting the forward end of the foremost fifth wheel of said pair or the rear end of the rearmost fifth wheel of said pair to the chassis, for causing the wheels of the respective axles to traverse substantially the same path when the trailer is moving forward or backward respectively, said last-named means comprising V-shaped notches in the forward end of the foremost fifth wheel and the rear end of the rearmost fifth wheel of said pair, and stop levers on the chassis for engagement in said notches.

4. In a trailer having a chassis for pivotal attachment to a towing vehicle, an elongated fifth wheel disposed longitudinally beneath said chassis, a vertical pivot connecting the central portion of said elongated fifth wheel to the chassis, a pair of fifth wheels pivotally connected to the forward and rear end portions respectively of said elongated fifth wheel, there being arcuate recesses in the top surfaces of each of said pair of fifth wheels, and depending arcuate projections on the elongated fifth wheel, said arcuate projections being of less length than the arcuate recesses and being slidably mounted in said arcuate recesses, a wheel-carrying axle upon each of said pair of fifth wheels, bars rigidly mounted upon the opposed ends of said pair of fifth wheels, means slidably and pivotally connecting said bars to each other, and means for selectively pivotally connecting the forward end of the foremost fifth wheel of said pair or the rear end of the foremost fifth wheel of said pair to the chassis, for causing the wheels of the respective axles to traverse substantially the same path when the trailer is moving forward or backward respectively.

5. In a trailer having a chassis for connection to a towing vehicle, an undercarriage located under each end portion of the chassis, each undercarriage comprising an elongated fifth wheel disposed longitudinally beneath said chassis, a vertical pivot connecting the central portion of each elongated fifth wheel to the chassis, a pair of fifth wheels pivotally connected to the inner and outer end portions respectively of each elongated fifth wheel, wheel-carrying axles upon said pairs of fifth wheels, bars rigidly mounted upon the opposed ends of each pair of fifth wheels, means slidably and pivotally connecting said bars to each other, means for connecting the outermost fifth wheel of one undercarriage to the towing vehicle, and means for pivotally connecting the inner end of the innermost fifth wheel of the other undercarriage to the chassis for causing the wheels of the respective axles to traverse substantially the same path as the towing vehicle.

6. In a trailer as defined in claim 5 said means for connecting the outermost fifth wheel of one undercarriage to the towing vehicle comprising, a draw bar upon the outermost fifth wheel of each undercarriage for selective connection to the towing vehicle, and said means for pivotally connecting the inner end of the innermost fifth wheel of the other undercarriage to the chassis comprising means for selectively pivotally connecting the innermost fifth wheel of each undercarriage to the chassis.

7. In a trailer having a chassis for pivotal attachment to a towing vehicle, an elongated fifth wheel disposed longitudinally beneath said chassis, a vertical pivot connecting the central portion of said elongated fifth wheel to the chassis, a pair of fifth wheels pivotally connected to the forward and rear end portions respectively of said elongated fifth wheel, a wheel-carrying axle upon each of said pair of fifth wheels, bars rigidly mounted upon opposed ends of said pair of fifth wheels, means slidably and pivotally connecting said bars to each other, and means for selectively pivotally connecting the forward end of the foremost fifth wheel of said pair or the rear end of the rearmost fifth wheel of said pair to the chassis, for causing the wheels of the respective axles to traverse substantially the same path when the trailer is moving forward, or backward respectively, said last named means comprising pivot openings in the forward end of the foremost fifth wheel and the rear end of the rearmost fifth wheel of said pair, and pivot members movably mounted on the chassis for movement into and out of engagement in said pivot openings.

References Cited in the file of this patent

UNITED STATES PATENTS

| | | |
|---|---|---|
| 902,821 | Jonas | Nov. 3, 1908 |
| 1,518,517 | Jonkhoff | June 19, 1923 |
| 1,715,263 | Winn | May 28, 1929 |
| 2,154,957 | Pinard | Apr. 18, 1939 |
| 2,291,174 | Stewart | July 28, 1942 |
| 2,466,194 | Anderson et al. | Apr. 5, 1949 |
| 2,662,781 | Hopson | Dec. 15, 1953 |
| 2,919,928 | Hoffer | Jan. 5, 1960 |

FOREIGN PATENTS

| | | |
|---|---|---|
| 9,579 | Netherlands | Sept. 15, 1923 |
| H25,796 | Germany | Dec. 6, 1956 |